United States Patent
Cockell, II

(10) Patent No.: US 9,242,741 B1
(45) Date of Patent: Jan. 26, 2016

(54) LOAD RELEASE SYSTEM

(71) Applicant: AIR RESCUE SYSTEMS CORPORATION, Ashland, OR (US)

(72) Inventor: Robert C. Cockell, II, Ashland, OR (US)

(73) Assignee: AIR RESCUE SYSTEMS CORPORATION, Ashland, OR (US)

( * ) Notice: Subject to any disclaimer, the term of this patent is extended or adjusted under 35 U.S.C. 154(b) by 0 days.

(21) Appl. No.: 14/592,153

(22) Filed: Jan. 8, 2015

Related U.S. Application Data

(60) Provisional application No. 61/942,682, filed on Feb. 21, 2014.

(51) Int. Cl.
*B64F 1/16* (2006.01)
*B64D 17/38* (2006.01)

(52) U.S. Cl.
CPC ............... *B64F 1/16* (2013.01); *B64D 17/383* (2013.01)

(58) Field of Classification Search
CPC ........ E01F 9/0182; E01F 9/018; E21D 15/22; B64D 17/36; B64D 17/38; B64D 17/383
USPC ................ 248/548; 244/137.3; 403/2; 52/98; 294/82.36, 82.24, 82.1
See application file for complete search history.

(56) References Cited

U.S. PATENT DOCUMENTS

| | | | | |
|---|---|---|---|---|
| 1,427,500 A | * | 8/1922 | St John ................ 244/11 OG |
| 2,410,816 A | * | 11/1946 | Frieder et al. ............. 294/82.34 |
| 3,396,924 A | * | 8/1968 | Kriesel ................ 244/137.3 |
| 3,504,460 A | * | 4/1970 | Solberg ............................ 52/98 |
| 6,241,298 B1 | * | 6/2001 | Whyte et al. ............. 294/82.36 |
| 6,382,583 B1 | * | 5/2002 | Hill et al. ...................... 248/548 |
| 6,698,544 B2 | * | 3/2004 | Kurtgis ............................ 182/3 |
| 6,990,928 B2 | * | 1/2006 | Kurtgis ........................ 119/770 |
| 7,942,242 B1 | * | 5/2011 | O'Connor et al. .............. 182/70 |
| 8,556,223 B2 | * | 10/2013 | Balfour et al. ................. 248/548 |
| 8,950,124 B2 | * | 2/2015 | Wellershoff ...................... 52/98 |
| 2004/0031644 A1 | * | 2/2004 | Kurtgis ............................ 182/3 |
| 2008/0283137 A1 | * | 11/2008 | Davis et al. .................. 138/103 |
| 2011/0000155 A1 | | 1/2011 | Wellershoff | |

FOREIGN PATENT DOCUMENTS

DE 3715361 A1 11/1988
GB 676949 A 8/1952

* cited by examiner

*Primary Examiner* — Nkeisha Smith
(74) *Attorney, Agent, or Firm* — Jerry Haynes Law

(57) ABSTRACT

A load release system provides load control safety for a rotary aircraft by automatically and manually releasing a load from an attached anchor when a predetermined load design point is reached. The system includes a cord that is disposed to extend between the load and the anchor, often through an anchor line. The cord is configured to release the load manually or automatically at a predetermined load design point, such as an excessive force, weight, tension, or movement. A load end includes a carabiner that manually attaches to and releases from the load. An anchor end includes a manual quick release ring with a pivoting end that is locked and released with a pin. The manual quick release ring is manually attached to and released from the anchor. An automatic release section automatically separates when the predetermined load design point is reached.

15 Claims, 5 Drawing Sheets

LOAD RELEASE SYSTEM

CROSS-REFERENCES TO RELATED APPLICATIONS

The present application claims priority from U.S. Provisional Application Ser. No. 61/942,682 filed on 21 Feb. 2014 which is hereby incorporated herein by reference in its entirety.

FIELD OF THE INVENTION

The present invention relates generally to a load release system for releasing a load from an anchor and in particular, the load release system enables both manual quick release and automatic separation mechanisms of an aircraft and an attached load to the aircraft from an anchor.

BACKGROUND OF THE INVENTION

Rotary aircrafts are sensitive to weight imbalance, especially while holding an external load. A common problem in addition to other numerous problems encountered when conventional method and system for difficulty in attaching and releasing an anchor from the external loads attached to the aircraft. Excessive load or movement of the load due to the movement of the aircraft or due to other environmental factors causing directional instability of the load as well as the aircraft.

Thus there is a need for quickly and manually attaching and releasing anchor line to the aerial loads and automatically separating the aerial loads from the anchor.

Numerous innovations for external load adapter system for aircraft have been provided in the prior art as described below. Even though these innovations may be suitable for the specific purposes to which they address, however, they differ from the present invention.

U.S. Pat. No. 1,427,500, issued on 29 Aug. 1922, to St John Miles C, teaches an automatically releasing anchoring device for aerial vehicles. Before an airplane will rise from the surface of the ground it is necessary that a considerable propeller speed be attained in order to provide the requisite lifting power. The self-contained anchoring device is secured to the underside of the fuselage of the airplane by screws or bolts engaged through the apertures in the flanges and when it is desired to anchor the airplane thereby the spring-pressed detent is manually released and the anchor cable or wire is drawn from the casing. The automatic break-away hook is secured to the ground by engaging the ring thereof around the stake and the ring in the outer end of the anchor cable is engaged in the hook. The airplane motor is started and when sufficient tension is exerted on the anchor cable by the pull of the airplane propeller, the hook will break and the airplane will be released.

U.S. Pat. No. 6,382,583, issued on 7 May 2002, to John L. Hill, III et al., teaches a safety device may be used to provide separation in the event of a side impact collision. The device may be used in a utility pole guy wire system, interposed between the guy wire and the ground anchor. The device operates in bending. A lateral force of sufficient magnitude applied to the device by the errant vehicle causes a rod within the device to break in tension, even though the tensile strength of the rod may be greater than that of the guy wire. The invention may be designed to tolerate axial loads, but to fail reliably when a side force exceeds a desired threshold.

U.S. No. 2011/0,000,155, published on Jan. 6, 2011, to Frank Wellershoff, teaches a cable end anchorage for fastening at least one cable at a supporting structure includes at least one first connecting element for connection with the supporting structure, at least one second connecting element for connection with the cable and at least one coupling element for connection of the two connecting elements in a force-transmitting manner. In the region of the coupling element, an overload device designed as a predetermined breaking point of the coupling element is provided for unfastening the connection between the two connecting elements when a critical load has been exceeded.

It is apparent now that numerous innovations for load release system for releasing load from anchor have been provided in the prior art that are adequate for various purposes. Furthermore, even though these innovations may be suitable for the specific purposes to which they address, accordingly, they would not be suitable for the purposes of the present invention as heretofore described. Thus a simple load release system for quick release of an aircraft and an attached load from an anchor through both manual quick release and automatic separation mechanisms option is needed.

SUMMARY OF THE INVENTION

The present invention of a load release system for releasing a load from an anchor and in particular, the load release system enables both manual quick release and automatic separation mechanisms of an aircraft and an attached load to the aircraft from an anchor.

The load release system comprising a cord, wherein the cord comprises a load end, an anchor end, and an automatic release section, the cord configured to join a load with an anchor, the load end comprising a carabiner configured to attach to the load, the carabiner comprising a generally C-shaped carabiner body comprising a first carabiner end and a second carabiner end, the carabiner further comprising a gate disposed to attach to the second carabiner end, the gate configured to change between a closed carabiner position and an open carabiner position, the carabiner further comprising a manually operable biasing element configured to inhibit the gate from changing from the closed carabiner position towards the open carabiner position, wherein manually changing the gate to the open carabiner position at least partially enables the load to separate from the anchor, the anchor end comprising a manual quick release ring configured to attach to the anchor, the manual quick release ring comprising a generally C-shaped first ring body disposed to join with a generally C-shaped second ring body, the first and second ring bodies disposed to join for forming a hinge end and a pin end, the hinge end configured to enable pivotal movement by the first ring body for pivoting between a closed ring position and an open ring position, the pin end configured to enable a pin to pass through for locking the first ring body into a closed ring position, the pin further configured to disengage from the pin end for pivoting the first ring body into an open ring position, the pin comprising a pin handle for facilitating manipulation of the pin, wherein manually disengaging the pin from the pin end at least partially enables the load to separate from the anchor, the automatic release section disposed to position along a longitudinal axis of the cord, the automatic release section comprising an automatic separation mechanism configured to activate at a predetermined load design point, the predetermined load design parameter comprising a force, and/or a weight, and/or a strain, and/or a movement, wherein automatic separation of the automatic release mechanism at least partially enables the load to separate from the anchor, the quick release section further comprising a pair of edges, the pair of edges comprising a pair of release section fasteners configured to join together for encapsulating the automatic separation mechanism.

It is an object of the invention to provide an automatic and quick load release system and method that can be adapted to function as both a manual quick release and an automatic system break away to safely release an aerial load from an anchor.

It is another object of the invention to provide an easy to manufacture and low cost automatic load release system that has quick attachment features so as to facilitate quick attachment of the load release system to the aerial load and the anchor.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which:

FIG. 1A illustrates an anchor line joining an anchor to a load, and FIG. 1B illustrates two anchor lines joining a load to a stationary anchor and a mobile anchor, in accordance with an embodiment of the present invention;

Like reference numerals refer to like parts throughout the various views of the drawings.

DETAILED DESCRIPTION OF THE INVENTION

Figure 1A:
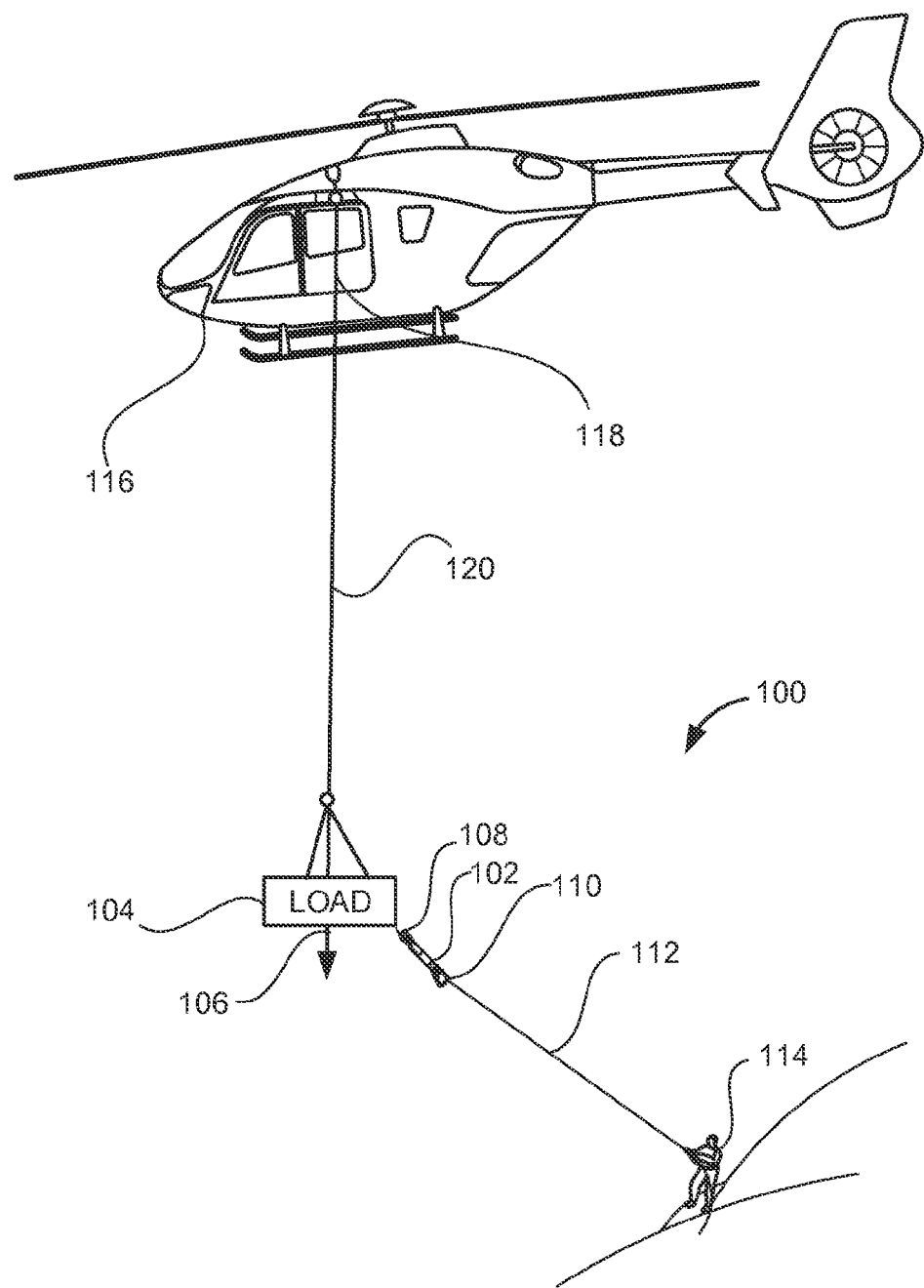
FIGS. 1A and 1B illustrate a diagram of an exemplary load release system, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A load release system 100 is described in FIGS. 1-4.

Figure 1B:
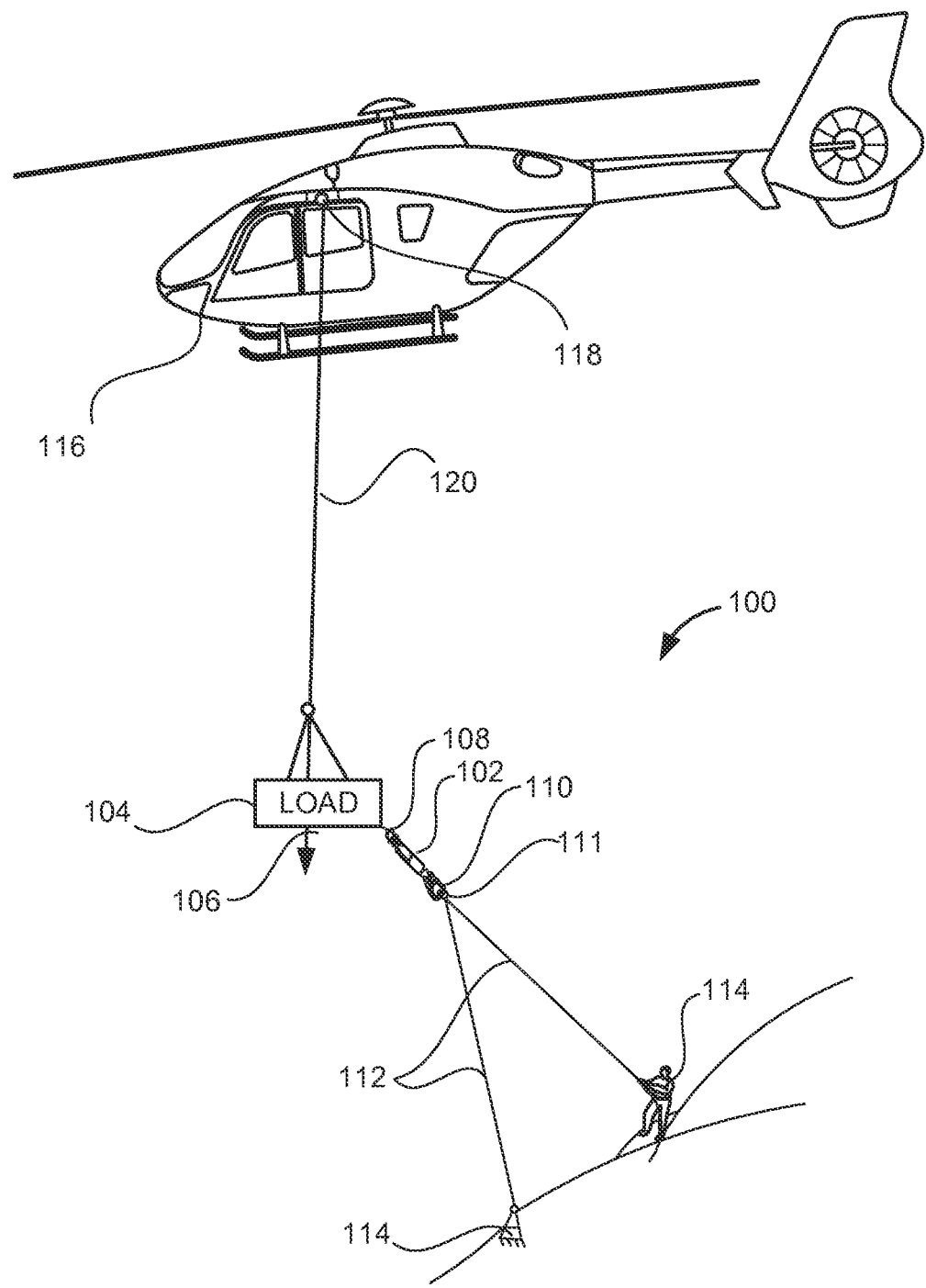

In one embodiment of the present invention, described in FIG. 1, a load release system 100 provides load control safety for an aircraft 116 by automatically and manually releasing a load 104 from an attached anchor 114 when a predetermined load design point 106 is reached. The manual release capacity creates a safety feature that enables the aircraft 116 and load 104 to escape from an overloaded system situation.

In some embodiments, the load release system 100 includes a cord 102 that is disposed to extend between the load 104 and the anchor 114, often through an anchor line 112. The cord 102 is configured to separate at a number of break points along a longitudinal axis of the cord 102. The cord 102 can separate at any of the break points to release the load 104 from the anchor 114. The separation at the break points may occur automatically at a predetermined load design point 106, such as an excessive force, weight, tension, or movement that is detrimental to the operation of the aircraft 116. The break points may also be actuated manually through a variety of quick release connections. In this manner, the load 104 may detach from the anchor 114 if the load release system 100 becomes overloaded or the operation of the aircraft 116 is adversely affected. The load 104 may also be detached for various other reasons, such as loading and unloading, maintenance, adverse weather, and adding additional loads. Those skilled in the art will recognize that overloaded conditions are detrimental to operation of the aircraft 116, and a quick, manual release of the load 104 may be necessary for safety of the aircraft 116, the load 104, and the anchor 114.

Figure 2:
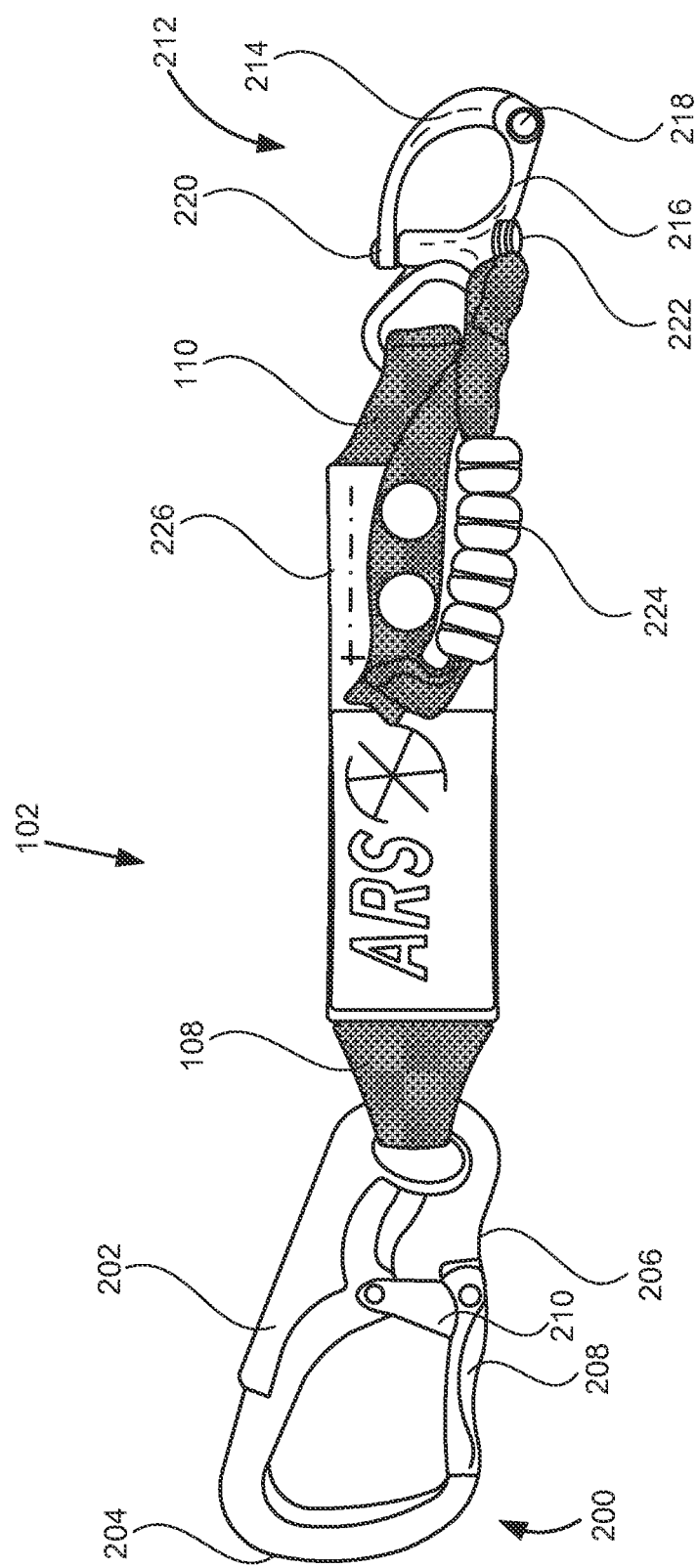
FIG. 2 illustrates a detailed perspective view of an exemplary cord with an exemplary an exemplary automatic release section, manual quick release ring attached to the anchor end and an exemplary manual release carabiner attached the load end, in accordance with an embodiment of the present invention.

Turning now to FIG. 2, the plurality of break points on the cord 102 utilize different release mechanisms that are manually and automatically activated to release the load 104 from the anchor 114 in direct relation to the predetermined load design point 106 generating excessive force in opposition of the anchor 114, or through manual manipulation. The release mechanisms position along a longitudinal axis of the cord 102. Each release mechanism utilizes a different means for releasing and attaching the load 104 to the anchor 114 or anchor line 112. Further, each release mechanism can be configured to attach and release the load 104 in different conditions. In some embodiments, the load release system 100 may be adapted to integrate with any known load control system, such as a tag line that extends from an aircraft 116.

In some embodiments, the load release system 100 may be adapted for variously sized and dimensioned loads 104 that attached to and transported by the aircraft 116. The load 104 may be supported by the aircraft 116 through a system 120, which extends from an aircraft attachment point 118, down to the load 104. The load 104 may include an object that is supported by the aircraft 116 from one end, and tethered to the anchor 114 or anchor line 112 from another end. The load release system 100 may include a cord that extends from the load 104 to the anchor line 112. A plurality of release mechanisms position along a longitudinal axis of the cord 102.

In some embodiments, the cord 102 may include, without limitation, a strong webbed fabric woven as a flat strip or tube of varying width and fibers, a rope, a cable, or any tethering system. The cord 102 comprises a load end 108, an anchor end 110, and an automatic release section 226, with each end and section having a release mechanism that enables potential separation. The load end 108 manual release mechanism may include a carabiner 200. The anchor end 110 release mechanism may include a manual quick release ring 212. And the release mechanism for the quick release section 226 may include an automatic separation mechanism 400. The anchor 114 may include, without limitation, a tree, a ground hook, a person, a building, or any weighted connection. The anchor 114 may be stationary or mobile, intentional or accidental. Further, two or more anchors 114 and anchor lines 112 may attach to the anchor end 110.

The load end 108 of the cord 102 attaches to the load 104 through a carabiner 200. The carabiner 200 attaches to, and releases from the load 104 manually, independent of the predetermined load design point 106. In one embodiment, the carabiner 200 comprises a generally C-shaped carabiner body 202 having a first carabiner end 204 and a second carabiner end 206. A gate 208 mounts at the second carabiner end 206 and pivots between an open carabiner position and a closed carabiner position. A manually operable biasing element 210 helps prevent the gate 208 from unintentionally changing from the closed carabiner position toward the open carabiner position without the use of manual force. The manual force may include an external pressure on the gate 208 sufficient to pivot the gate 208 from the closed carabiner position to the open carabiner position.

Figure 3:
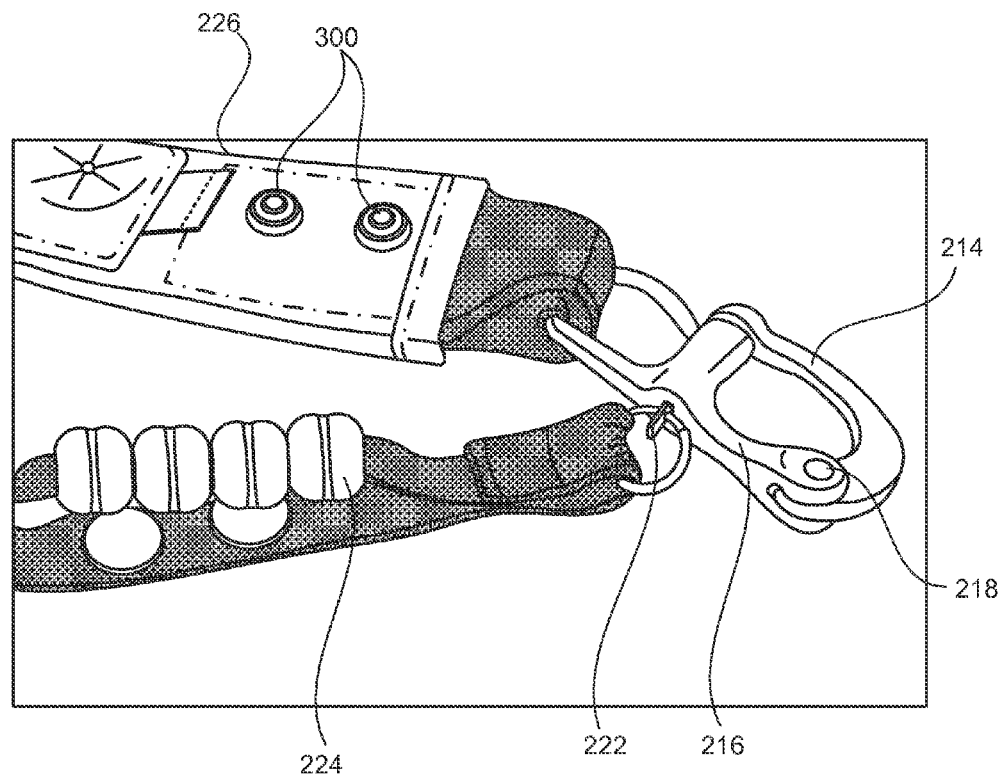
FIG. 3 illustrates a detailed perspective view of an exemplary manual quick release ring attached to the anchor end, in accordance with an embodiment of the present invention.

As referenced in FIG. 3, the anchor end 110 of the cord 102 attaches to the anchor 114 or anchor line 112 through a manual quick release ring 212, which may include, without limitation, a capture eye, a ring, and a caribiner with a capture eye. The fastening ring 212 attaches to, and releases from the anchor 114 or anchor line 112 through manual means, independent of the predetermined load design point 106. In one embodiment, the fastening ring 212 comprises a generally C-shaped first ring body 214 that joins with a generally C-shaped second ring body 216 to from a capture eye through which the anchor 114 or anchor line 112 fastens. The first and second ring bodies 214, 216 join at a hinge end 218 and a pin end 220. The hinge end 218 enables pivotal movement by the first ring body 214 for opening and closing the fastening ring 212. The pin end 220 enables a pin 222 to pass through for locking the fastening ring 212 into a closed ring position. Conversely, manually removing the pin 222 releases the first ring body 214 from the second ring body 216, and thereby forms an open ring position that enables the anchor end 110 to separate from the anchor 114.

Figure 4:
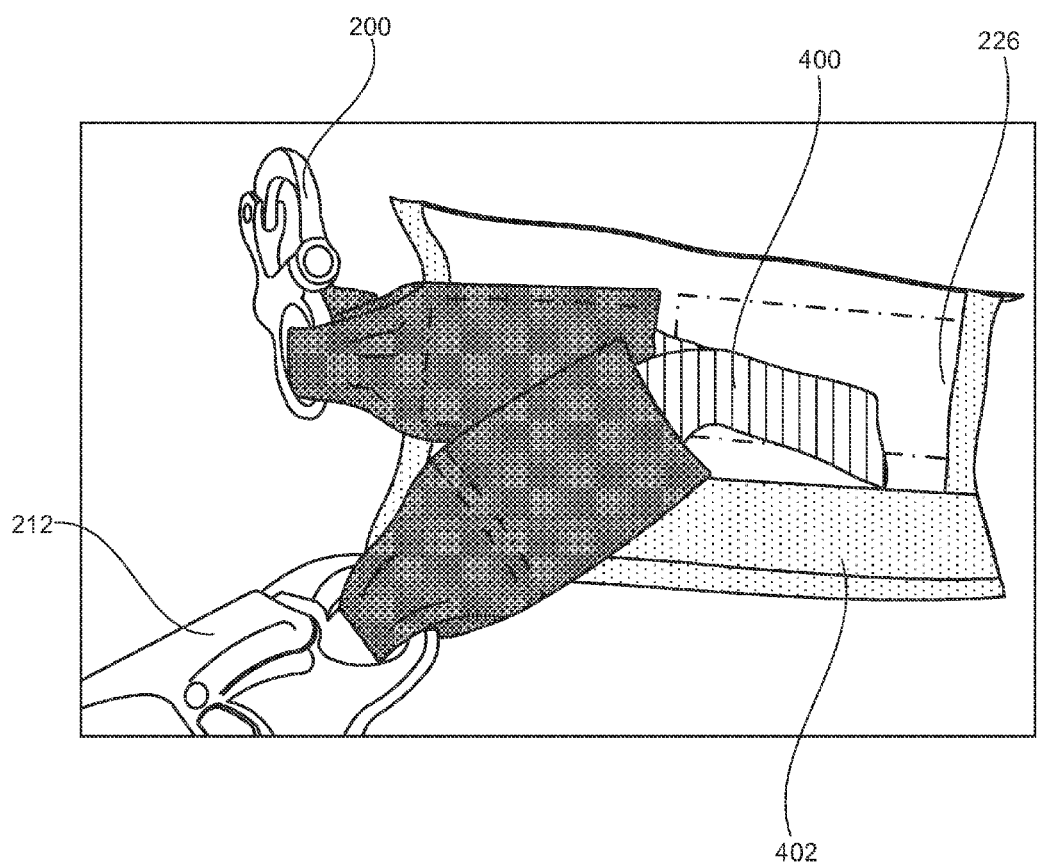
FIG. 4 illustrates a detailed perspective view of an exemplary quick release section with an exemplary automatic separation mechanism exposed for inspection, in accordance with an embodiment of the present invention.

Turning to FIG. 4, the cord 102 includes an automatic release section 226 that lies along a longitudinal axis of the cord 102. The automatic release section 226 includes an automatic separation mechanism 400 configured to automatically and completely break the cord 102, dependent on the predetermined load design point 106. The automatic release section 226 may utilize an external webbing or tarp material that encapsulates the automatic separation mechanism 400. Each outer edge of the material includes a release section fastener 402, such as a hook and loop fastener, which join to fasten together for encapsulating the automatic separation mechanism 400. The release section fastener 402 can be unfastened to enable inspection of the quick release mechanism 400. Additionally, an outer pin handle fasteners 300 may be attached to automatic release section 226 to provide additional securement of the pin handle 224. The outer pin handle fasteners 300 may include, without limitation, a button, a snap button, and a magnet.

The automatic separation mechanism 400 may include a force rated release material that breaks at the predetermined load design point 106. In one embodiment, the automatic separation mechanism 400 may include a pair of straps that form a grip to each other through a hook and loop fastener. The strength of the grip is configured to maintain the automatic separation mechanism 400 up to the predetermined load design point 106. The grip is configured to break when the predetermined load design point 106 is reached, thereby resulting in the automatic separation mechanism 400 separating and releasing the load 104 from the anchor 114 at the automatic release section 226 of the cord 102.

In some embodiments, any of the release mechanisms described above may be used, either in conjunction or separately, to release the load 104 from the anchor 114 or anchor line 112. Those skilled in the art, in light of the present embodiments, will recognize that a rotary aircraft can be leveraged by attaching a load 104 to an anchor 114.

A first aspect of the present invention provides a load release system 100 for quick release of a load 104 from an anchor 114, comprising: a cord 102 comprising a load end 108, an anchor end 110, and an automatic release section 226, the cord 102 configured to join a load 104 with an anchor 114, the load end 108 comprising a carabiner 200 configured to attach to the load 104, the carabiner 200 comprising a generally C-shaped carabiner body 202 comprising a first carabiner end 204 and a second carabiner end 206, the carabiner 200 further comprising a gate 208 disposed to attach to the second carabiner end 206, the gate 208 configured to change between a closed carabiner position and an open carabiner position, the carabiner 200 further comprising a manually operable biasing element 210 configured to inhibit the gate 208 from changing from the closed carabiner position towards the open carabiner position, wherein manually pivoting the gate 208 to the open carabiner position at least partially enables the load 104 to separate from the anchor 114, the anchor end 110 comprising a fastening ring 212 configured to attach to the anchor 114, the manual quick release ring 212 comprising a generally C-shaped first ring body 214 disposed to join with a generally C-shaped second ring body 216, the first and second ring bodies 214, 216 disposed to join for forming a hinge end 218 and a pin end 220, the hinge end 218 configured to enable pivotal movement by the first ring body 214 for pivoting between a closed ring position and an open ring position, the pin end 220 configured to enable a pin 222 to pass through for locking the first ring body 214 into a closed ring position, the pin 222 further configure to disengage from the pin end 220 for pivoting the first ring body 214 into an open ring position, the pin 222 comprising a pin handle 224 for facilitating manipulation of the pin 222, wherein manually disengaging the pin 222 from the pin end 220 at least partially enables the load 104 to separate from the anchor 114, the quick release section 226 disposed to position along a longitudinal axis of the cord 102, the quick release section 226 comprising a quick release mechanism 400 configured to automatically separate at a predetermined load design point 106, the predetermined load 104 design parameter comprising a force, and/or a weight, and/or a strain, and/or a movement, wherein activation of the automatic separation mechanism 400 at least partially enables the load 104 to separate from the anchor 114, the automatic release section 226 further comprising a pair of edges, the pair of edges comprising a pair of release section fasteners 402 configured to join together for encapsulating the quick release mechanism 400.

In a second aspect, the load release system 100 is a load control safety device. The load release system 100 functions as both a manual quick release and an automatic system break away. The load release system 100 is utilized as a part of a larger load control system, for example, a tag line that anchors the aircraft 116 to the anchor 114. The load release system 100 is triggered to automatically separate the load 104 from the anchor 114 or anchor line 112 when a predetermined load design point 106 is reached.

In another aspect, the cord 102 comprises a strong fabric woven as a flat strip or tube of varying width and fibers, a rope, or a cable. The cord 102 is configured to attach a load 104 to an anchor line 112 that attaches to an anchor 114, such as a tree, a person, or a weighted object. In other embodiments, the cord 102 may, however, attach directly to the anchor 114. The attachment of the load 104 to the anchor 114 helps leverage the aircraft 116 and provide stability during operation. This may especially be useful for heavy or uneven loads. The leveraging and stabilizing effects of the load release system 100 may be especially beneficial for a rotary aircraft, where a main rotor must coordinate with a tail rotor to achieve stability.

In another aspect, the cord 102 may include a sewn webbing fabricated from synthetic material having a weight capacity of at least four hundred pounds. The composition of the cord 102 may include, without limitation, polyester synthetics, nonwoven material, rubber, cotton, chain metal, and synthetic filaments. The release section fastener, which makes up a section of the cord 102, may include, without limitation, a hook and loop fastener, a button, a magnet, a screw, and an adhesive.

In another aspect, a pulley 111 may attach to the anchor end 110 of the cord 102. In this embodiment, the manual quick release ring 212 attaches to the axle of the pulley 111. The anchor line 112 passes around the periphery of the pulley 111 and extends down to join with two separate anchor points, such as a weighted object and a person. In this manner, the person may be sufficiently mobile to help control the load 104, balancing the second anchor point and the cord 102 against each other to increase stability. The fastening ring 212 may be manually separated from the pulley 111 as needed.

In another aspect, the position on the cord 102 of the carabiner 200 and the fastening ring 212 may be reversed. In this configuration, the carabiner 200 attaches the anchor end 110 to the anchor 114 or anchor line 112. Also, the manual quick release ring 212 attaches the load end 108 to the load 104.

In another aspect, the carabiner 200 and the manual quick release ring 212 may be fabricated from a rigid material, including, without limitation, metal, steel, aluminum, metal alloy, and a rigid polymer.

In another aspect, a line system 120 extends between the load 104 and the aircraft 116. The line system 120 extends from the load 104 to an attachment point 118 on the aircraft 116. The line system 120 can be used to raise the load 104 into the aircraft 116 or apply tension to the cord 102 changing the position of the load 104 for the aircraft 116.

One objective of the present invention is to increase safety by providing multiple break away points between a load 104 that is supported by an aircraft 116, and an anchor 114. The breakaway point can be automatic when a predetermined load design point 106 is reached. The breakaway point may also be actuated manually.

Another objective is to minimize twisting and pendulums of the load 104 during transport by forming stable connections between the anchor 114 and the load 104.

Yet another objective is to expedite attachment and detachment of the load 104 with quick attachment mechanisms, such as a carabiner 200 and a capture eye with a pin 222.

Another objective is to provide additional clearance for the load 104 while clearing an aircraft entry point 118 during loading and unloading.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated. Thus, the scope of the invention should be determined by the appended claims and their legal equivalence.

What is claimed is:

1. A load release system for quick release of an aerial load from an anchor, the load release system comprising:
   a cord configured to join the load with the anchor, wherein the cord comprising a load end, an anchor end, and an automatic release section;
   the load end comprising a carabiner configured to attach to the load, the carabiner comprising a gate and a manually operable biasing element, wherein the manually operable biasing element prevents the gate from opening of the carabiner without use of manual force, wherein manually changing the gate to open the carabiner enables the load to separate from the anchor;
   the anchor end comprising a manual quick release ring configured to attach to the anchor, the manual quick release ring comprising two C-shaped ring bodies pivotally joined at a hinge end and lockable at a pin end, wherein the pin end further comprising a pin handle for facilitating manipulation of a pin, wherein manually disengaging the pin from the pin end enables the load to separate from the anchor; and
   the automatic release section disposed along longitudinal axis of the cord, the automatic release section comprising an automatic separation mechanism which includes a force rated release material that breaks at a predetermined load design point thereby enabling the load to automatically and completely separate from the anchor when the load design point is reached.

2. The system of claim 1, wherein the aerial load is the aircraft itself or at least one load attached to the aircraft or both the aircraft and the load.

3. The system of claim 1, wherein the cord is configured to separate at plurality of break points along a longitudinal axis of the cord such that the cord can separate at any of the break points to release the load from the anchor.

4. The system of claim 1, wherein the force rated release material of the cord may include a sewn webbing fabricated material, nonwoven material, rubber, cotton, chain metal, and synthetic filaments or combination thereof having a weight capacity of at least four hundred pounds.

5. The system of claim 1, wherein the automatic separation mechanism includes a pair of straps that form a grip to each other through a hook and loop fastener, wherein strength of the grip is configured to maintain the automatic separation mechanism up to the predetermined load design point, thereby resulting in the automatic separation mechanism separating and releasing the load from the anchor.

6. The system of claim 1, wherein the pin handle comprising an outer pin handle fasteners that is attached to automatic release section to provide additional securement of the pin handle, wherein the outer pin handle fasteners may include a button, a snap button, a magnet, a screw, an adhesive or combination thereof.

7. The system of claim 1, wherein a pulley may be attached to the anchor end of the cord, wherein the manual quick release ring attaches to an axle of the pulley and an anchor line passes around a periphery of the pulley and extends down to join with two separate anchor points to increase stability.

8. A method for quickly and automatically releasing an aerial load from an anchor, the method comprising:
  joining the load with the anchor by a cord, wherein the cord comprising a load end, an anchor end, and an automatic release section;
  attaching the load end to a carabiner, the carabiner comprising a gate and a manually operable biasing element, wherein the manually operable biasing element prevents the gate from unintentional opening of the carabiner, wherein manually changing the gate to open the carabiner enables the load to separate from the anchor;
  attaching the anchor end to a manual quick release ring which comprises two C-shaped ring bodies pivotally joined at a hinge end and lockable at a pin end, wherein the pin end further comprising a pin handle for facilitating manipulation of the pin so as to disengage of the pin from the pin end thus enables the load to separate from the anchor; and
  disposing the automatic release section along longitudinal axis of the cord, the automatic release section comprising an automatic separation mechanism which includes a force rated release material that breaks at a predetermined load design point so as to automatically and completely separating the load from the anchor.

9. The method of claim 8, wherein the aerial load is the aircraft itself or at least one load attached to the aircraft or both the aircraft and the load.

10. The method of claim 8, wherein the force rated release material of the cord may include a sewn webbing fabricated material, nonwoven material, rubber, cotton, chain metal, and synthetic filaments or combination thereof having a weight capacity of at least four hundred pounds.

11. The method of claim 8, wherein the carabiner comprises a C-shaped carabiner body having a first carabiner end and a second carabiner end, wherein the gate mounts at the second carabiner end and pivots to open or close the carabiner.

12. The method of claim 8, wherein the automatic separation mechanism includes a pair of straps that form a grip to each other through a hook and loop fastener, wherein strength of the grip is configured to maintain the automatic separation mechanism up to the predetermined load design point, thereby resulting in the automatic separation mechanism separating and releasing the load from the anchor.

13. The method of claim 8, wherein the pin handle comprising an outer pin handle fasteners that is attached to automatic release section to provide additional securement of the pin handle, wherein the outer pin handle fasteners may include a button, a snap button, a magnet, a screw, an adhesive or combination thereof.

14. The method of claim 8, wherein a pulley may be attached to the anchor end of the cord, wherein the manual quick release ring attaches to an axle of the pulley and an anchor line passes around a periphery of the pulley and extends down to join with two separate anchor points to increase stability.

15. The method of claim 8, wherein a position of the carabiner and the manual quick release ring may be reversed, so that the carabiner attaches to the anchor end and the manual quick release ring attaches to the load end.

* * * * *